United States Patent
Imai

(10) Patent No.: US 10,078,378 B2
(45) Date of Patent: Sep. 18, 2018

(54) POSITION DETECTION DEVICE, DISPLAY DEVICE, METHOD OF CONTROLLING POSITION DETECTION DEVICE, AND METHOD CONTROLLING DISPLAY DEVICE FOR DISCRIMINATING A POINTING ELEMENT

(71) Applicant: SEIKO EPSON CORPORATION, Tokyo (JP)

(72) Inventor: Shun Imai, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 197 days.

(21) Appl. No.: 15/070,661

(22) Filed: Mar. 15, 2016

(65) Prior Publication Data

US 2016/0282967 A1 Sep. 29, 2016

(30) Foreign Application Priority Data

Mar. 23, 2015 (JP) ................................ 2015-059311

(51) Int. Cl.
  *G06F 3/0354* (2013.01)
  *G06F 3/042* (2006.01)
  *G06F 3/041* (2006.01)

(52) U.S. Cl.
  CPC ........ *G06F 3/03542* (2013.01); *G06F 3/0418* (2013.01); *G06F 3/0425* (2013.01)

(58) Field of Classification Search
  CPC ... G06F 3/03542; G06F 3/0425; G06F 3/0418
  See application file for complete search history.

(56) References Cited

U.S. PATENT DOCUMENTS

| 2010/0214215 A1* | 8/2010 | Benenson ............. G06F 3/0346 345/158 |
| 2014/0098041 A1* | 4/2014 | Ji .......................... G06F 3/0488 345/173 |
| 2017/0038852 A1* | 2/2017 | Hildreth .................. G06F 3/017 |

FOREIGN PATENT DOCUMENTS

JP 2011-203816 A 10/2011

* cited by examiner

*Primary Examiner* — Kwang-Su Yang
(74) *Attorney, Agent, or Firm* — Oliff PLC

(57) ABSTRACT

A position detection device includes a detection section adapted to detect an operation to a screen, a detection control section adapted to discriminate the pointing element with which the operation is performed, and then associate the operation with the pointing element, and a processing section adapted to process the operation associated with the pointing element out of the operations. In the case in which a first operation and a second operation, which is performed within a predetermined period of time before the first operation, with a single pointing element are detected, and a coordinate of the first operation and a coordinate of the second operation are located within a predetermined range, the detection control section determines the coordinate of the first operation as the same coordinate as the coordinate of the second operation. Further, the detection control section changes the predetermined range in accordance with the pointing element.

5 Claims, 3 Drawing Sheets

POSITION DETECTION DEVICE, DISPLAY
DEVICE, METHOD OF CONTROLLING
POSITION DETECTION DEVICE, AND
METHOD CONTROLLING DISPLAY DEVICE
FOR DISCRIMINATING A POINTING
ELEMENT

The entire disclosure of Japanese Patent Application No. 2015-059311, filed Mar. 23, 2015 is expressly incorporated by reference herein.

BACKGROUND

1. Technical Field

The present invention relates to a position detection device, a display device, a method of controlling a position detection device, and a method of controlling a display device.

2. Related Art

In the past, there has been known a position detection device for detecting an operation having been performed on the display surface using a pointing element (see, e.g., JP-A-2011-203816 (Document 1)). The coordinate input device of Document 1 corrects the coordinate so that a single click operation or a double click operation is easy to recognize even if wobbling of a motion of a hand of a human or a displacement of the input due to parallax or a shadow occurs when performing the click operation or the double click operation to the operation screen using an electronic pen, a hand, or the like.

However, in a pointing operation to the display surface using a pointing element, it is not necessarily possible for the user to point the position, which the user wants to point, without fail. In the case in which the operator stands in front of the display surface to point a display content on the display surface, since the arm of the operator is not fixed, if the pointing element is large, or the position to be pointed is far, it is difficult to point the target position. In other words, a degree of difficulty for the operator in pointing the target position with a pointing element differs by the size of the pointing element and so on.

SUMMARY

An advantage of some aspects of the invention is to provide a position detection device, a display device, a method of controlling a position detection device, and a method of controlling a display device each improved in operability of the operation with a pointing element.

A position detection device according to an aspect of the invention includes a detection section adapted to detect an operation to a display surface, a discrimination section adapted to discriminate a pointing element with which the operation detected by the detection section is performed, and associate the operation and the pointing element with each other, and a processing section adapted to process the operation associated with the pointing element out of the operations detected by the detection section, and, in a case in which a first operation and a second operation, which is performed within a predetermined period of time before the first operation, with a single pointing element are detected, and a coordinate of the first operation and a coordinate of the second operation are located within a predetermined range, the discrimination section determines the coordinate of the first operation as a same coordinate as the coordinate of the second operation, and the discrimination section changes the predetermined range in accordance with the pointing element.

According to this aspect of the invention, it is possible to improve the operability of the operation with the pointing element.

In the aspect of the invention, in the position detection device having the configuration described above, the discrimination section may change the range in accordance with a length of the pointing element.

According to the aspect of the invention with this configuration, even if the pointing element different in length is used, the operation with the pointing element just as intended can be realized.

In the aspect of the invention, in the position detection device having the configuration described above, the discrimination section may set the range so that the greater the length of the pointing element is, the larger the range is.

According to the aspect of the invention with this configuration, although the greater the length of the pointing element is, the easier the wobble occurs in the pointed position by the operation, by setting a wider range as the range in which the coordinates are determined as the same coordinates, the operation with the pointing element just as intended can be realized despite the occurrence of the wobble.

In the aspect of the invention, the position detection device having the configuration described above may further include a storage section adapted to store discrimination information used to discriminate the pointing element and information of the range set in accordance with the pointing element so as to be associated with each other, and the discrimination section may determine whether or not the coordinate of the first operation is to be treated as a same coordinate as the coordinate of the second operation based on the information of the range corresponding to the pointing element discriminated.

According to the aspect of the invention with this configuration, even if the pointing element to be used for the operation has been changed, it is possible to set the information of the range corresponding to the pointing element set in advance. Therefore, there is no need to calculate the setting of the range every time the pointing element is changed.

A position detection device according to another aspect of the invention includes a detection section adapted to detect an operation to a display surface, a discrimination section adapted to discriminate a pointing element with which the operation detected by the detection section is performed, and associate the operation and the pointing element with each other, and a processing section adapted to process the operation associated with the pointing element out of the operations detected by the detection section, wherein in a case in which a first operation with a first pointing element and a second operation, which is performed within a first time before the first operation, with the first pointing element are detected, and a coordinate of the first operation and a coordinate of the second operation are located within a first range, the discrimination section determines the coordinate of the first operation as the same coordinate as the coordinate of the second operation, and in a case in which a third operation with a second pointing element different from the first pointing element and a fourth operation, which is performed within a second time before the third operation, with the second pointing element are detected, and a coordinate of the third operation and a coordinate of the fourth operation are located within a second range different from the first range, the discrimination section determines the coordinate of the third operation as the same coordinate as the coordinate of the fourth operation.

According to this aspect of the invention, it is possible to improve the operability with the pointing element.

A display device according to another aspect of the invention includes a display section adapted to display an image on a display surface, a detection section adapted to detect an operation to the display surface, a discrimination section adapted to discriminate a pointing element with which the operation detected by the detection section is performed, and associate the operation and the pointing element with each other, and a processing section adapted to process the operation associated with the pointing element out of the operations detected by the detection section, and, in a case in which a first operation and a second operation, which is performed within a predetermined period of time before the first operation, with a single pointing element are detected, and a coordinate of the first operation and a coordinate of the second operation are located within a predetermined range, the discrimination section determines the coordinate of the first operation as the same coordinate as the coordinate of the second operation, and the discrimination section changes the predetermined range in accordance with the pointing element.

According to this aspect of the invention, it is possible to improve the operability of the operation with the pointing element.

A method of controlling a position detection device according to another aspect of the invention includes detecting an operation to a display surface, discriminating a pointing element with which the operation detected in the detecting is performed, and associating the operation and the pointing element with each other, and processing the operation associated with the pointing element out of the operations detected in the detecting, wherein, in a case in which a first operation and a second operation, which is performed within a predetermined period of time before the first operation, with a single pointing element are detected, and a coordinate of the first operation and a coordinate of the second operation are located within a predetermined range, the coordinate of the first operation is determined as the same coordinate as the coordinate of the second operation in the associating, and the predetermined range is changed in accordance with the pointing element.

According to this aspect of the invention, it is possible to improve the operability of the operation with the pointing element.

A method of controlling a display device according to another aspect of the invention includes displaying an image on a display surface, detecting an operation to the display surface, discriminating a pointing element with which the operation detected in the detecting is performed, and associating the operation and the pointing element with each other, and processing the operation associated with the pointing element out of the operations detected in the detecting, wherein, in a case in which a first operation and a second operation, which is performed within a predetermined period of time before the first operation, with a single pointing element are detected, and a coordinate of the first operation and a coordinate of the second operation are located within a predetermined range, the coordinate of the first operation is determined as the same coordinate as the coordinate of the second operation in the associating, and the predetermined range is changed in accordance with the pointing element.

According to this aspect of the invention, it is possible to improve the operability of the operation with the pointing element.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
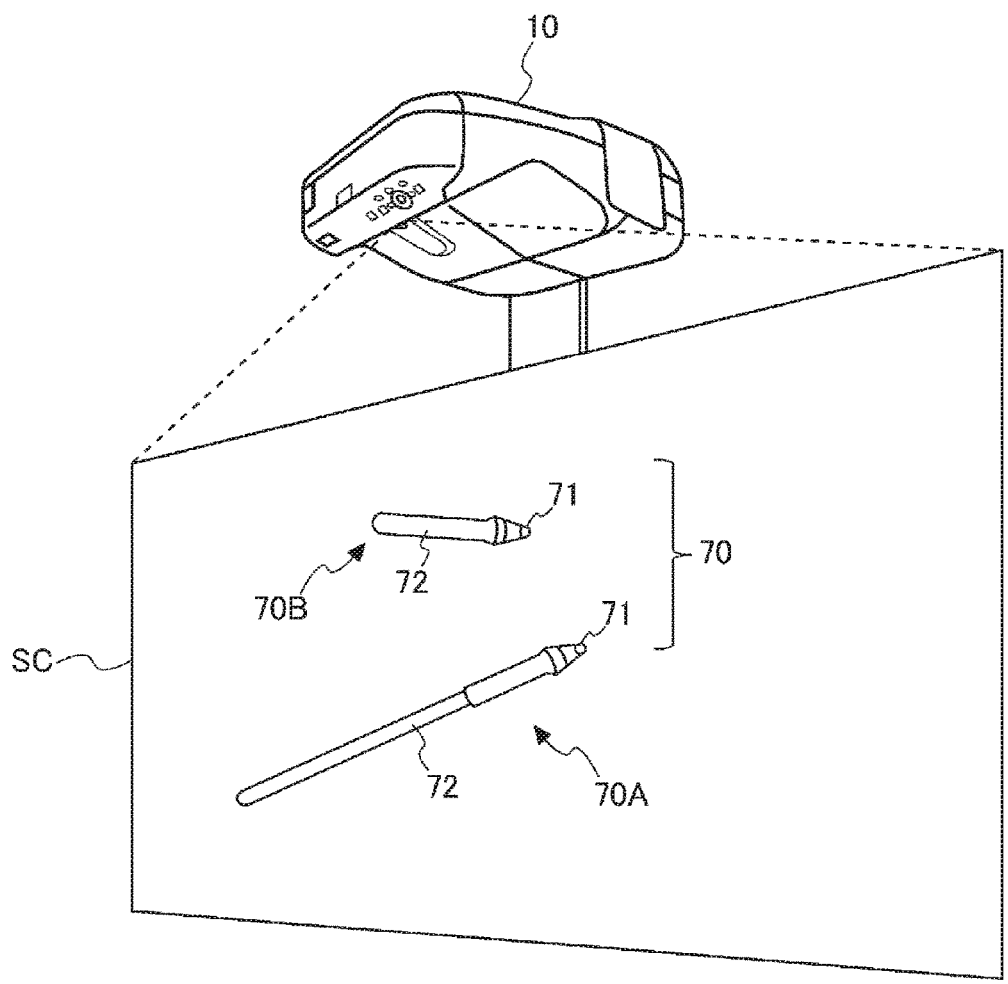
FIG. 1 is a diagram showing an installation condition of a projector.

FIG. 1 is a diagram showing an installation condition of a projector (a display device) 10.

The projector 10 is disposed directly above or obliquely above the screen SC as a display surface, and projects an image toward the screen SC located obliquely below. The screen SC is a flat plate or a curtain fixed to a wall surface, or erected on the floor surface. The installation condition of the projector 10 is not limited to the example shown in FIG. 1, but it is also possible to use a wall surface as the screen SC. In this case, it is advisable to attach the projector 10 to a top part of the wall surface used as the screen SC.

The projector 10 detects an operation of the operator to the screen SC. In the operation to the screen SC, there can be used a pointing element 70. The pointing element 70 is an input device having, for example, a pen-like shape, and is classified into two types, namely a long-sleeve pointing element 70A and a short-sleeve pointing element 70B. The long-sleeve pointing element 70A is longer in length than the short-sleeve pointing element 70B. For example, since the length of a sleeve section 72 of the long-sleeve pointing element 70A, which is a part held by the operator in hand, is longer than that of the short-sleeve pointing element 70B, the long-sleeve pointing element 70A is made longer than the short-sleeve pointing element 70B. The short-sleeve pointing element 70B is high in convenience in inputting characters, and the long-sleeve pointing element 70A can also be used as an indicator rod for pointing a position on the screen SC.

It should be noted that although in the description of the present embodiment, the case of using two types, namely the long-sleeve pointing element 70A and the short-sleeve pointing element 70B, as the pointing element 70 is described as an example, the types of the pointing element 70 are not limited to these two types.

For example, it is also possible to use the pointing element 70 having a medium length between the long-sleeve pointing element 70A and the short-sleeve pointing element 70B in addition to the long-sleeve pointing element 70A and the short-sleeve pointing element 70B. Further, in the following description, in the case in which it is not necessary to particularly distinguish the long-sleeve pointing element 70A and the short-sleeve pointing element 70B from each other, the long-sleeve pointing element and the short-sleeve pointing element are each simply referred to as the pointing element 70.

Figure 2:
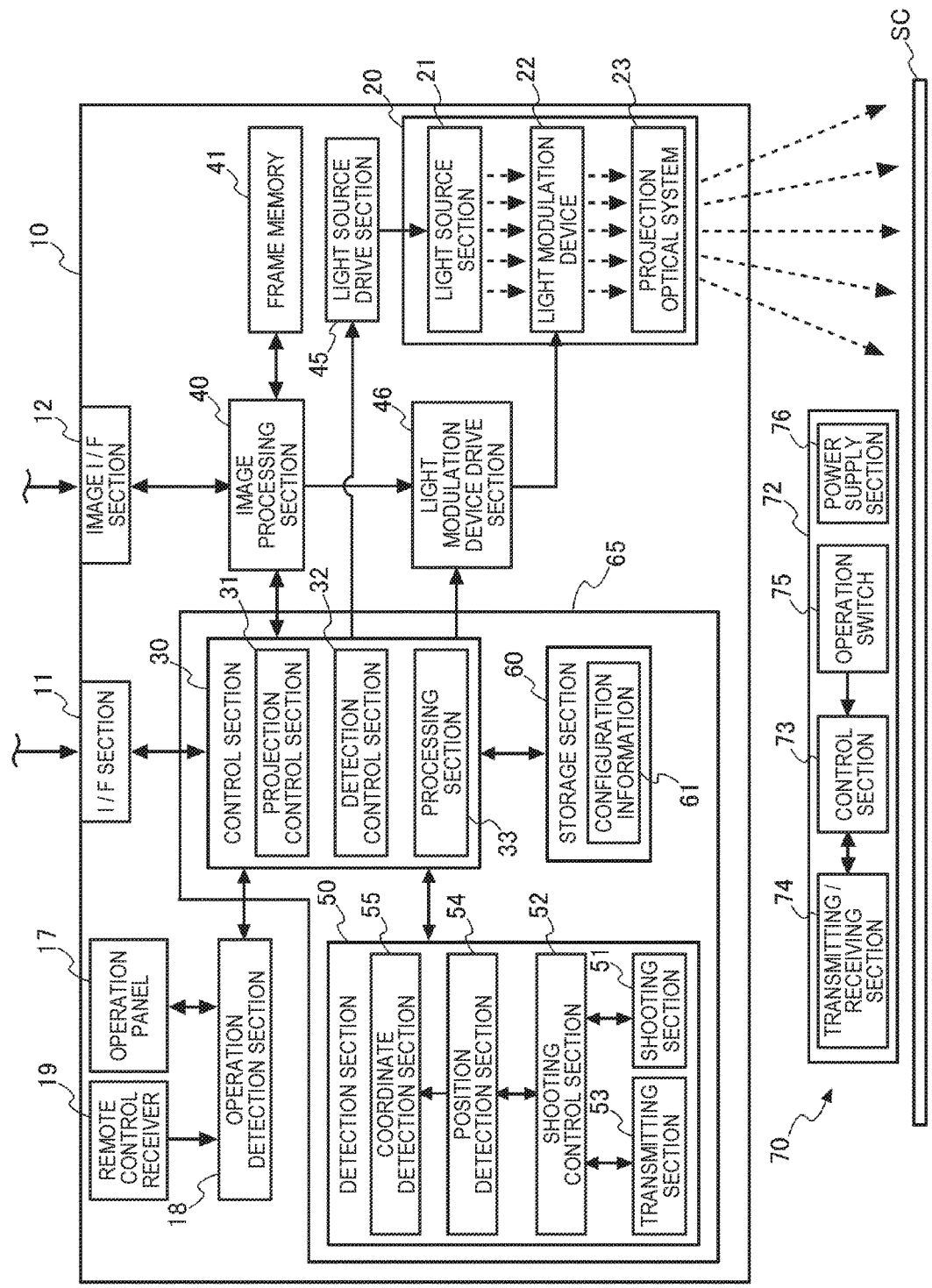
FIG. 2 is a functional block diagram of the projector and a pointing element.

FIG. 2 is a diagram showing a configuration of the projector 10 and the pointing element 70. Firstly, the pointing element 70 will be described.

The pointing element 70 is provided with a control section 73, a transmitting/receiving section 74, an operation switch 75, and a power supply section 76. The control section 73, the transmitting/receiving section 74 and the power supply section 76 are housed in the sleeve section 72.

The transmitting/receiving section 74 is provided with a light source such as an infrared LED, and a light receiving element for receiving infrared light (an infrared signal), puts ON/OFF the light source in accordance with control by the control section 73, and outputs a signal representing the light reception state of the light receiving element to the control section 73.

The operation switch 75 is incorporated in the tip portion 71 of the pointing element 70, and is set to the ON state in the case of being pressed. The pointing element 70 is operated so that the tip portion 71 has contact with the screen SC with the sleeve section 72 having a rod-like shape held by the operator in hand. When the tip portion 71 of the pointing element 70 has contact with the wall or the screen SC, the operation switch 75 is set to the ON state.

The control section 73 is connected to the transmitting/receiving section 74 and the operation switch 75, and detects one of an ON state and an OFF state of the operation switch 75. The control section 73 makes a lighting pattern of the light source provided to the transmitting/receiving section 74 different between the case in which the operation switch 75 is in the ON state and the case in which the operation switch 75 is in the OFF state. The projector 10 detects the position of the tip portion 71 based on the infrared light (the infrared signal) emitted by the pointing element 70. Further, the projector 10 determines whether or not the pointing element 70 is pressed against the wall or the screen SC based on the lighting pattern of the infrared light emitted by the pointing element 70.

The power supply section 76 has a dry battery or a secondary cell as a power source, and supplies the electric power to each of the sections, namely the control section 73, the transmitting/receiving section 74, and the operation switch 75. In the pointing element 70, there is installed a power switch (not shown) for switching ON/OFF the power supply from the power supply section 76.

A configuration of the projector 10 will continuously be described with reference to FIG. 2.

The projector 10 is connected to an image supply device (not shown) such as a personal computer (PC), a video reproduction device, a DVD reproduction device, or a Blu-ray (registered trademark) disc reproduction device. The projector 10 projects an image on the screen SC based on an analog image signal or digital image data supplied from the image supply device. Further, it is also possible for the projector 10 to read out the image data stored in a storage section 60 incorporated in the projector 10 or a storage medium externally connected to the projector 10, and then display an image on the screen SC based on the image data.

The projector 10 is provided with an I/F (interface) section 11 and an image I/F section 12 as interfaces for connection with the external devices including the image supply device. The I/F section 11 and the image I/F section 12 are each provided with a connector for wired connection. The I/F section 11 and the image I/F section 12 each can also be provided with a interface circuit corresponding to the connector. Further, the I/F section 11 and the image I/F section 12 each can also be provided with a wireless communication interface.

As the connector and the interface circuit for the wired connection, there can be cited those compliant to wired LAN, IEEE1394, USB, or the like. Further, as the wireless communication interface, there can be cited those compliant to wireless LAN, Bluetooth (registered trademark), or the like. As the image I/F section 12, there can also be used an interface for image data such as an HDMI (registered trademark) interface. The image I/F section 12 can also be provided with an interface through which sound data is input.

The I/F section 11 is an interface for transmitting and receiving a variety of types of data with an external device. The I/F section 11 inputs and outputs data related to projection of an image, data for setting the operation of the projector 10, and so on. The control section 30 described later transmits and receives data to or from an external device via the I/F section 11.

The image I/F section 12 is an interface through which the digital image data is input. The projector 10 according to the present embodiment projects an image based on the digital image data input via the image I/F section 12. It should be noted that the projector 10 can also be provided with a function of projecting an image based on the analog image signal, and in this case, the image I/F section 12 can be provided with an interface for an analog image signal, and an A/D conversion circuit for converting the analog image signal into digital image data.

The projector 10 is provided with a projection section 20 for performing formation of an optical image. The projection section 20 is provided with a light source section 21, a light modulation device 22, and a projection optical system 23. The light source section 21 is provided with a light source formed of a xenon lamp, a super-high pressure mercury lamp, a light emitting diode (LED), a laser source, or the like. Further, the light source section 21 can also be provided with a reflector and an auxiliary reflector for guiding the light emitted by the light source to the light modulation device 22. Further, the projector 10 can be provided with a lens group for enhancing the optical characteristics of the projection light, a polarization plate, a dimming element for reducing the light intensity of the light emitted by the light source on a path leading to the light modulation device 22, and so on (all not shown).

The light modulation device 22 is provided with, for example, three transmissive liquid crystal panels corresponding respectively to the three primary colors of RGB, and modulates the light to be transmitted through the liquid crystal panels to thereby generate the image light. The light from the light source section 21 is separated into colored light beams of three colors of RGB, and the colored light beams enter the corresponding liquid crystal panels, respectively. The colored light beams, which have been modulated while passing through the respective liquid crystal panels, are combined by a combining optical system such as a cross dichroic prism, and are then output to the projection optical system 23.

The projection optical system 23 is provided with a lens group for guiding the image light, which has been modulated by the light modulation section 22, toward the screen SC to form the image on the screen SC. Further, the projection optical system 23 can also be provided with a zoom mechanism for performing expansion/contraction of the display image on the screen SC, and a focus adjustment mechanism for performing an adjustment of the focus. Further, in the case in which the projector 10 is of a short focus type, it is also possible to provide the projection optical system 23 with a concave mirror for reflecting the image light toward the screen SC.

The projection section 20 is connected to a light source drive section 45 for lighting the light source section 21 in accordance with the control by the control section 30, and a light modulation device drive section 46 for operating the light modulation device 22 in accordance with the control by the control section 30. The light source drive section 45 can also be provided with a function of switching between lighting and extinction of the light source section 21 to control the light intensity of the light source section 21.

The projector 10 is provided with an image processing system for processing the image to be projected by the projection section 20. The image processing system includes the control section 30 for controlling the projector 10, the storage section 60, an image processing section 40, and a frame memory 41. Further, the projector 10 is provided with an operation panel 17, an operation detection section 18, a remote control receiver 19, a detection section 50 besides the constituents described above. The control section 30 and the detection section 50 constitute a position detection device 65.

The control section 30 is provided with hardware such as a CPU, a ROM, and a RAM, and controls the projector 10 by the CPU executing a basic control program stored in the ROM and a control program stored in the storage section 60. Further, the control section 30 executes the control program stored in the storage section 60 to thereby function as a projection control section 31, a detection control section 32, and a processing section 33. The description of the projection control section 31, the detection control section 32, and the processing section 33 will be provided later.

The storage section 60 is a nonvolatile memory such as a flash memory or an EEPROM, and stores the control program used by the control section 30 for the control, and configuration information 61. The configuration information 61 includes threshold values used in the processing by the control section 30. The threshold values are each a threshold value for the distance used to determine whether or not coordinates of two different points on the screen SC pointed by a single pointing element 70 are treated as the same coordinates. The storage section 60 stores the threshold values set for each of the pointing elements (the long-sleeve pointing element 70A, the short-sleeve pointing element 70B) in association with discrimination information for discriminating each of the pointing elements 70.

The image processing section 40 obtains the image data, which is input from the image I/F section 12, in accordance with the control by the control section 30. The image processing section 40 determines attributes such as an image size, resolution, whether the image data represents a still image or a moving image, a frame rate in the case of the moving image, whether or not the image data is three-dimensional image data, regarding the image data thus obtained.

The image processing section 40 is connected to the frame memory 41, and develops the image data thus obtained in the frame memory 41 frame by frame. The image processing section 40 performs the image processing on the image data thus developed. The image processing section 40 performs a process such as a resolution conversion process, a gamma correction process, a color shading correction process, a luminance correction process, or a shape correction process as the image processing. Further, it is obviously possible for the image processing section 40 to perform two or more of the processes described above in combination with each other.

The image processing section 40 reads out the image having been processed from the frame memory 41, generates image signals of R, G, and B corresponding to the image, and then outputs the image signals to the light modulation device drive section 46.

The light modulation device drive section 46 drives the liquid crystal panels of the light modulation device 22 based on the image signal input from the image processing section 40 to draw the image.

The operation panel 17 is provided with a variety of switches and indicator lamps for the operator to perform operations. The operation panel 17 is connected to the operation detection section 18. The operation detection section 18 appropriately lights or blinks the indicator lamps of the operation panel 17 in accordance with the operation state and the setting state of the projector 10 in accordance with the control by the control section 30. Further, when the switch of the operation panel 17 is operated, an operation signal corresponding to the switch having been operated is input to the control section 30 via the operation detection section 18.

Further, the remote control receiver 19 receives the infrared signal emitted by the remote controller (not shown). The remote control receiver 19 is connected to the operation detection section 18. The remote control receiver 19 decodes the infrared signal received from the remote controller to generate an operation signal representing the operation content in the remote controller, and then outputs the operation signal to the operation detection section 18. The operation signal generated by the remote control receiver 19 is input to the control section 30 via the operation detection section 18.

The detection section 50 is provided with the shooting section 51, a shooting control section 52, a transmitting section 53, a position detection section 54, and a coordinate detection section 55, and detects the operation of the pointing element 70 to the screen SC.

The operations detected by the detection section 50 include a contact operation performed while keeping the pointing element 70 contact with the screen SC. Further, a non-contact operation of performing an operation of the pointing element 70 in the vicinity of the screen SC without making the pointing element 70 have contact with the screen SC can also be included in the operations detected by the detection section 50. The non-contact operation includes, for example, an operation of gesture using the pointing element 70. For example, it is also possible for the projector 10 to perform a process of, for example, continuously shooting the motion of the pointing element 70 with the shooting section 51, detecting the motion such as a gesture from the data of the shot images, and switching the display of the screen SC based on the motion thus detected.

The shooting section 51 has an imaging optical system, an imaging element, an interface circuit, and so on, and shoots the projection direction of the projection optical system 23. The imaging optical system of the shooting section 51 is disposed facing to roughly the same direction as the projection optical system 23, and has a field angle of defining a range including the screen SC and the periphery of the screen SC as a shooting range. As the imaging element, there can be cited a CCD and a CMOS capable of receiving light in the infrared region and the visible region. The shooting section 51 can also be provided with a filter partially blocking the light entering the imaging element, and it is also possible to dispose a filter for mainly transmitting the light in the infrared region in front of the imaging element, for example. Further, the interface circuit of the shooting section 51 reads out and then outputs the detection value of the imaging element.

The shooting control section 52 makes the shooting section 51 perform shooting to form data of the shot image. When the imaging element performs shooting with visible light, the image projected on the screen SC is shot. Further, the shooting control section 52 can make the shooting section 51 shoot the infrared light, and in the data of the shot image in this case, there appears the infrared light emitted by the pointing element 70.

The transmitting section 53 transmits the infrared signal to the pointing element 70 in accordance with the control by the shooting control section 52. The transmitting section 53 has a light source such as an infrared LED, and puts ON or OFF the light source in accordance with the control by the shooting control section 52.

The position detection section 54 detects an image of the light emitted by the pointing element 70 from the data of the shot image input from the shooting control section 52. The position detection section 54 detects the image of the light emitted by the pointing element 70 from the data of the shot images shot in a pointing element discrimination phase and a position detection phase described later.

The coordinate detection section 55 calculates the coordinate of the pointed position by the pointing element 70 in the data of the shot image based on the position of the image detected by the position detection section 54, and then outputs the result to the control section 30. The coordinate detection section 55 detects the coordinate of the image of the light, which has been detected by the position detection section 54 from the data of the shot images in the pointing element discrimination phase and the position detection phase. Further, it is also possible for the coordinate detection section 55 to calculate the coordinate of the pointed position by the pointing element 70 in the projection image projected by the projection section 20 to output the result to the control section 30. Further, it is also possible for the coordinate detection section 55 to calculate the coordinate of the pointed position by the pointing element 70 in the image data drawn by the image processing section 40 in the frame memory 41, and the coordinate of the pointed position by the pointing element 70 in the input image data of the image I/F section 12.

Here, a method of distinguishing between the long-sleeve pointing element 70A and the short-sleeve pointing element 70B from the data of the shot image, and a method of detecting an operation by the pointing element 70 will be described.

The control section 30 controls the shooting control section 52 to make the transmitting section 53 transmit the infrared light for synchronization. In other words, the shooting control section 52 lights the light source of the transmitting section 53 with a predetermined period in accordance with the control by the control section 30. The infrared light periodically emitted by the transmitting section 53 functions as a sync signal for synchronizing the detection section 50 and the pointing element 70 with each other.

The control section 73 of the pointing element 70 performs a predetermined initialization operation in response to commencement of power supply from the power supply section 76, and then receives the infrared light emitted by the transmitting section 53 of the projector 10 using the transmitting/receiving section 74. The control section 73 of the pointing element 70 lights the light source of the transmitting/receiving section 74 with a lighting pattern, which is unique to each of the pointing elements 70 set in advance, in sync with the timing at which the transmitting/receiving section 74 has received the infrared light.

The projector 10 repeatedly performs a communication sequence including three phases, namely a synchronization phase, a pointing element discrimination phase, and a position detection phase, to perform communication with each of the pointing elements 70.

The synchronization phase is a phase for the projector 10 to make each of the pointing elements 70 recognize the start timing of a communication cycle to thereby synchronize the projector 10 and each of the pointing elements 70 with each other.

The pointing element discrimination phase is a phase for discriminating the pointing element 70 with the power switch set to the ON state. In the pointing element discrimination phase, each of the pointing elements 70 lights with the unique lighting pattern set to each of the pointing elements 70. Discrimination of the pointing element 70 can be arranged to be achieved with a single communication sequence, or can also be achieved based on the information transmitted and received with a plurality of times of communication sequence.

The position detection phase is a phase for detecting the lighting position of the pointing element 70. In the case in which the tip portion 71 has contact with the screen SC, and the operation switch 75 is in the ON state, the control section 73 of the pointing element 70 lights the transmitting/receiving section 74 at a timing different from that in the case in which the operation switch 75 is in the OFF state. The detection section 50 of the projector 10 detects the position of a bright point appearing in the data of the shot image shot in the position detection phase to identify the coordinate of the pointed position by the pointing element 70.

The control section 73 of the pointing element 70 repeatedly performs the communication cycle described above during the period in which the electric power is supplied from the power supply section 76. In other words, the transmitting section 53 periodically transmits the infrared signal for synchronization to the pointing element 70, and the pointing element 70 transmits the infrared light at a predetermined timing in sync with the infrared light transmitted by the transmitting section 53.

Then, a process of each of the functional blocks provided to the control section 30 will be described.

The projection control section 31 obtains the content of the operation performed by the operator operating the remote controller based on the operation data input from the operation detection section 18. The projection control section 31 controls the image processing section 40, the light source drive section 45, and the light modulation device drive section 46 in accordance with the operation performed by the operator to thereby project the image on the screen SC.

Further, the projection control section 31 controls the image processing section 40 to make the image processing section 40 perform a discrimination process between a 3D (stereoscopic) image and a 2D (planar) image described above, a resolution conversion process, a frame rate conversion process, a distortion correction process, a digital zoom process, a color compensation process, a luminance correction process, and so on.

Further, the projection control section 31 controls the light source drive section 45 in accordance with the process of the image processing section 40 to thereby control the light intensity of the light source section 21.

The detection control section 32 controls the detection section 50 to detect the operation (the coordinate of the pointed position) to the screen SC with the pointing element 70.

Further, the detection control section 32 determines the pointing element 70 based on the shooting timing of the data of the shot image in the pointing element discrimination phase input from the detection section 50. For example, in the case of assuming that the shooting by the shooting section 51 is performed four times in the pointing element discrimination phase, it is also possible to determine that the coordinate of the bright point shot at the odd-numbered (first, third) shooting timing corresponds to the long-sleeve pointing element 70A. Further, it is also possible to determine that the coordinate of a bright point shot at the even-numbered (second, fourth) shooting timing corresponds to the short-sleeve pointing element 70B. Further, it is also possible to provide two pointing element discrimination phases in one communication sequence, then light the transmitting/receiving section 74 of the long-sleeve pointing element 70A, namely the first, pointing element discrimination phase, and light the transmitting/receiving section 74 of the short-sleeve pointing element 70B in the second pointing element discrimination phase. In this case, the detection control section 32 determines the bright point appearing in the data of the shot image in the first pointing element discrimination phase as the long-sleeve pointing element 70A, and determines the bright point appearing in the data of the shot image in the second pointing element discrimination phase as the short-sleeve pointing element 70B.

Further, it is also possible to discriminate the pointing element 70 based on the information transmitted and received with a plurality of times of communication sequence. For example, lighting/non-lighting states in the four times of pointing element discrimination phase in four consecutive communication sequences are set in the long-sleeve pointing element 70A as "1001" ("1" denotes lighting state, and "0" denotes non-lighting state). Further, the lighting/non-lighting states in the four times of pointing element discrimination phase in the four consecutive communication sequences are set in the short-sleeve pointing element 70B as "0101." In this case, by comparing the data of the shot images shot in the pointing element discrimination phase in the four consecutive communication sequences with each other, it is possible to discriminate the long-sleeve pointing element 70A and the short-sleeve pointing element 70B from each other.

Further, the detection control section 32 determines the pointing element 70 having pointed the coordinate detected by the detection section 50, and further, determines the contact state of the tip portion 71 of the pointing element 70 with the screen SC based on the data of the shot image in the position detection phase.

The detection control section 32 determines the coordinate of the bright point appearing in the data of the shot image in the position detection phase input from the detection section 50 as the coordinate of the pointed position. Further, the detection control section 32 determines the pointing element (the long-sleeve pointing element 70A, the short-sleeve pointing element 70B) having pointed this coordinate based on the comparison with the coordinate of the bright point appearing in the data of the shot image in the pointing element discrimination phase.

Further, in the case of assuming that the shooting section 51 performs shooting four times in the position detection phase, the detection control section 32 determines that the tip portion 71 does not have contact with the screen SC at the coordinate of the bright point shot at, for example, the odd-numbered (first, third) shooting timing. Further, the detection control section 32 determines that the tip portion 71 has contact with the screen SC in the coordinate of the bright point shot at the even-numbered (second, fourth) shooting timing.

Figure 3:
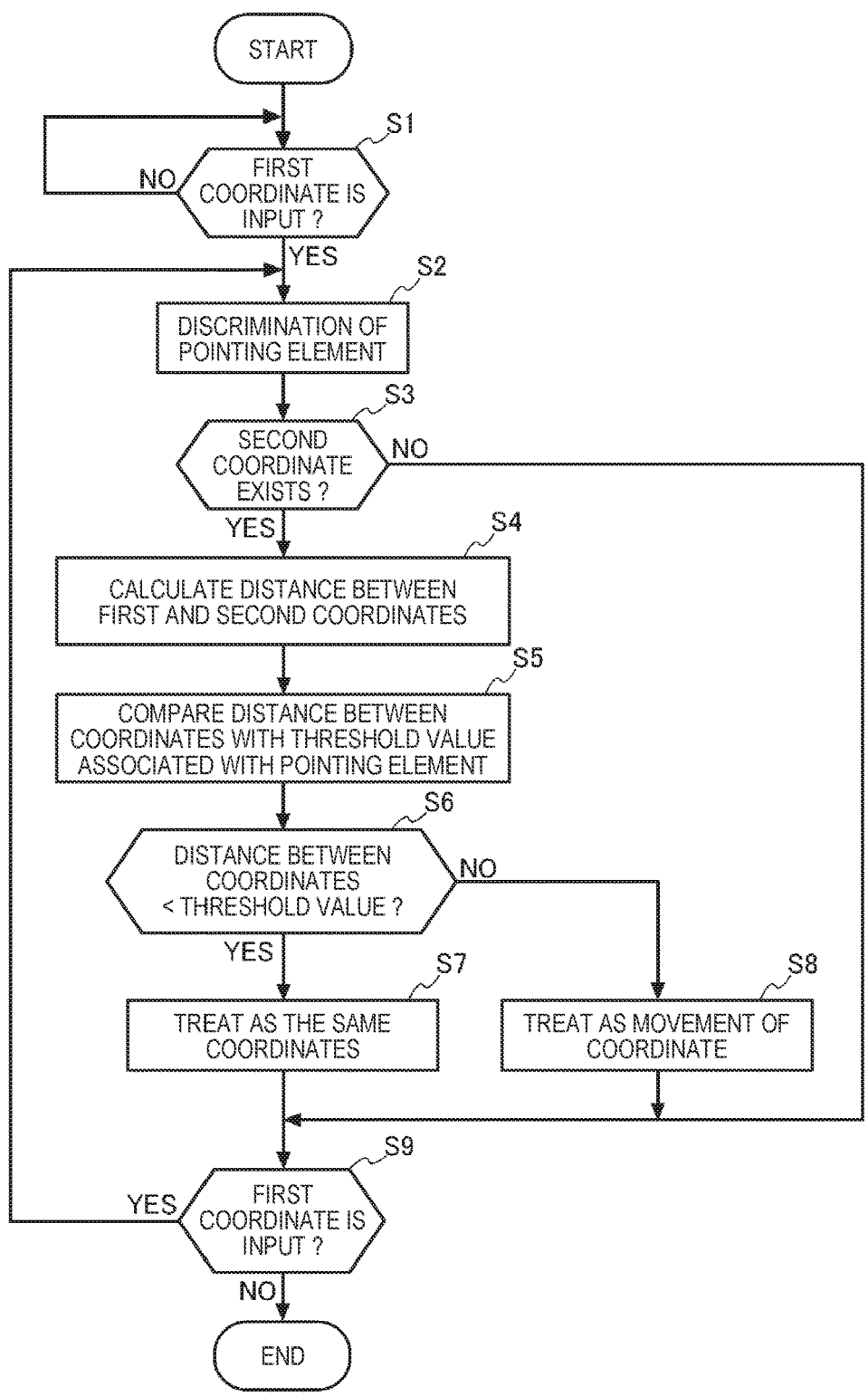
FIG. 3 is a flowchart showing a processing procedure of a control section.

Further, the detection control section 32 determines whether or not the coordinate of the pointed position, which has been determined based on the data of the shot image in the position detection phase, will be changed. FIG. 3 is a flowchart showing a processing flow for determining whether or not the coordinate of the pointed position will be changed. This processing flow will be described below with reference to FIG. 3.

In the case of pointing a position on the screen SC with the pointing element 70, the operator of the pointing element 70 points the position on the screen SC standing up in many cases. In the case of pointing the position on the screen SC standing up, since the arm holding the pointing element 70 is not fixed and is in an unstable state, a displacement occurs between the position the operator wants to point and the position actually pointed in some cases. In particular, the greater the length of the pointing element is, the higher the ratio of occurrence of the displacement is.

When a coordinate (hereinafter referred to as a first coordinate (corresponding to a first coordinate, a third coordinate)) of a bright point appearing in the data of the shot image in the pointing element discrimination phase is input (YES in the step S1) from the detection section 50, the detection control section 32 determines (step S2) the pointing element pointing the first coordinate. The first coordinate is a coordinate detected from the data of the shot image of a first operation, which has been performed by the operator on the screen SC. The detection control section 32 determines whether the coordinate of the bright point appearing in the data of the shot image in the pointing element discrimination phase is a coordinate having been pointed with the long-sleeve pointing element 70A or a coordinate having been pointed with the short-sleeve pointing element 70B. The discrimination method of the pointing element 70 is as described above.

After the detection control section 32 has discriminated the pointing element 70 having pointed the coordinate, the detection control section 32 determines (step S3) whether or not there exists a coordinate (hereinafter referred to as a second coordinate (corresponding to a second coordinate, a fourth coordinate)) having been pointed by this pointing element 70 within a predetermined time before pointing of the first coordinate. When the coordinate is input from the detection section 50, the detection control section 32 stores the coordinate thus input and the pointing element 70 having pointed the coordinate in a memory such as a RAM so as to be associated with each other. Further, the predetermined time (corresponding to predetermined time, first time, and second time, wherein the first time and the second time can be equal to each other, or can be different from each other) is set to an appropriate value taking practical determination accuracy into consideration. Further, the second coordinate is a coordinate detected from the data of the shot image of a second operation, which has been performed by the operator on the screen SC.

In the case in which there exists the second coordinate input within a predetermined period of time before the input of the first coordinate (YES in the step S3), the detection control section 32 calculates (step S4) the distance between the coordinates, namely the first coordinate and the second coordinate. Further, in the case in which the second coordinate does not exist (NO in the step S3), the detection control section 32 makes the transition to the process in the step S9. In the step S9, the detection control section 32 determines (step S9) whether or not the first coordinate has newly been input. In the case in which the first coordinate has newly been input (YES in the step S9), the detection control section 32 returns to the step S2 to repeat the processes from the step S2 once again. Further, in the case in which the new first coordinate has not been input (NO in the step S9), the detection control section 32 terminates the processing flow.

In the case in which the detection control section 32 calculates the distance between the coordinates in the step S4, the detection control section 32 compares (step S5) the distance between the coordinates thus calculated and the threshold value corresponding to the pointing element 70 having been determined in the step S2 with each other. The storage section 60 stores the threshold values prepared for each of the pointing elements 70 as the configuration information 61. Specifically, the storage section 60 stores the threshold value (a first range) prepared for the long-sleeve pointing element 70A, and at the same time stores the threshold value (a second range) prepared for the short-sleeve pointing element 70B. The threshold value prepared for the long-sleeve pointing element 70A and the threshold value prepared for the short-sleeve pointing element 70B are different from each other. For example, the threshold value prepared for the long-sleeve pointing element 70A can also be set to be larger in value than the threshold value prepared for the short-sleeve pointing element 70B. Since the long-sleeve pointing element 70A is longer in the length of the sleeve section 72 than the short-sleeve pointing element 70B, the wobble in the operation to the screen SC tends to be larger in the case of using the long-sleeve pointing element 70A. However, by using a higher threshold value as the threshold value prepared for the long-sleeve pointing element 70A, the operation of the long-sleeve pointing element 70A just as intended by the operator can be realized even if the wobble has increased. Further, it is also possible to arrange that the greater the length of the pointing element 70 is, the larger the threshold value to be used for the pointing element 70 is set (in other words, the threshold value is set so that the predetermined range described later increases).

The detection control section 32 compares the threshold value, which has been read out from the storage section 60, and corresponds to the pointing element 70, and the distance between the coordinates with each other to determine whether or not the distance between the coordinates is within the predetermined range. In the case in which the distance between the coordinates is shorter than the threshold value (YES in the step S6), the detection control section 32 changes the first coordinate to the second coordinate to treat the first coordinate as the same coordinate as the second coordinate. Specifically, the detection control section 32 determines that an erroneous coordinate has been detected as the pointed position due to the wobble of the tip portion 71 performing the operation with the pointing element 70, and changes the first coordinate to the second coordinate. Further, in the case in which the distance between the coordinates is equal to or longer than the threshold value (NO in the step S6), the detection control section 32 determines (step S8) the distance as a movement of the coordinate. In other words, the detection control section 32 determines that the pointed position by the pointing element 70 has been changed from the second coordinate to the first coordinate. Then, the detection control section 32 determines (step S9) whether or not the first coordinate has newly been input. In the case in which the first coordinate has newly been input (YES in the step S9), the detection control section 32 returns to the step S2 to repeat the processes from the step S2 once again. Further, in the case in which the new first coordinate has not been input (NO in the step S9), the detection control section 32 terminates the processing flow.

Further, the detection control section 32 generates locus data representing the movement locus of the pointed position based on the coordinates continuously input. As the locus data, the detection control section 32 generates an aggregate of the coordinates, which are the coordinates of the pointed positions pointed by the same pointing element 70, and at which the tip portion 71 of the pointing element 70 is determined to have contact with the screen SC. Further, it is also possible for the detection control section 32 to generate an aggregate of the coordinates, which are the coordinates of the pointed positions pointed by the same pointing element 70, and at which the tip portion 71 of the pointing element 70 is determined not to have contact with the screen SC, as the locus data. It is also possible to detect, for example, a gesture with the pointing element 70 using the locus data representing the aggregate of the coordinates at which the tip portion 71 of the pointing element 70 is determined not to have contact with the screen SC.

The detection control section 32 passes the coordinate of the pointed position, the discrimination information of the pointing element 70 having pointed the pointed position, and the information representing whether the tip portion 71 of the pointing element 70 and the screen SC are in the contact state or in the non-contact state, to the processing section 33. Further, the detection control section 32 passes the locus data, and the discrimination information of the pointing element 70 having pointed the locus represented by the locus data, to the processing section 33.

The processing section 33 performs a predetermined process based on the coordinate of the pointed position or the locus data obtained from the detection control section 32. The processing section 33 performs, for example, the function assigned to a button in the menu bar overlapping the coordinate of the pointed position thus obtained. The menu bar is an object showing a list of the selectable functions on the screen SC, and as the selectable functions, there can be cited, for example, drawing of a figure (e.g., a curved line, a straight line, a circle, an ellipse, or a quadrangle), coloring of the figure having been drawn, partial erasure of the figure having been drawn, and undoing of a process. Further, the processing section 33 performs a process of, for example, making the image processing section 40 draw a figure, characters, and symbols based on the locus data, then superimpose the figure and so on thus drawn on the input image input through the image I/F section 12, and then project the result.

Further, it is also possible for the processing section 33 to output the coordinate thus obtained to an external device such as a PC connected to the I/F section 11. In this case, it is also possible for the processing section 33 to convert the coordinate thus obtained into a data format which can be recognized as an input of a coordinate input device in the operating system of the external device connected to the I/F section 11, and then output the result. For example, in the case in which the PC operating with the Windows (registered trademark) operating system is connected to the I/F section 11, the processing section 33 outputs the data to be processed as the input data of the HID (human interface device) in the operating system.

As described hereinabove, the position detection device 65 according to the present embodiment to which the invention is applied is provided with the detection section 50 and the control section 30. The detection section 50 detects an operation to the screen SC. The control section discriminates the pointing element 70 with which the operation detected by the detection section 50 has been performed, and then associates the operation and the pointing element 70 with each other. Further, the control section 30 processes the operation associated with the pointing element 70 out of the operations detected by the detection section 50. Further, in the case in which the first operation and the second operation, which is performed within a predetermined period of time before the first operation, with a single pointing element 70 are detected, and a coordinate of the first operation and a coordinate of the second operation are located within a predetermined range, the control section 30 determines the coordinate of the first operation as the same coordinate as the coordinate of the second operation. Further, the control section 30 changes the predetermined range in accordance with the pointing element 70. Therefore, it is possible to improve the operability of the operation with the pointing element 70.

Further, the control section 30 changes the range in accordance with the length of the pointing element 70. Therefore, even if the operation is performed using the pointing element different in length, the operation with the pointing element 70 just as intended can be realized.

Further, the control section 30 sets the range so that the greater the length of the pointing element is, the larger the range is. Although the greater the length of the pointing element 70 is, the easier the wobble occurs in the pointed position by the operation, by setting a wider range as the range in which the coordinates are determined as the same coordinates, the operation with the pointing element 70 just as intended can be realized despite the occurrence of the wobble.

Further, the projector 10 is provided with the storage section 60 for storing the discrimination information for discriminating the pointing element 70, and the information of the range set in accordance with the pointing element 70 so as to be associated with each other. The detection control section 32 determines whether or not the coordinate of the first operation is treated as the same coordinate as the coordinate of the second operation based on the information of the range corresponding to the pointing element 70 thus discriminated. Therefore, even if the pointing element 70 used for the operation is changed, it is possible to set the range, in which the coordinates are determined as the same coordinates, to the range corresponding to the pointing element 70 based on the information stored in the storage section 60. Therefore, there is no need to calculate the setting of the range every time the pointing element 70 is changed.

Further, the position detection device 65 according to the present embodiment to which the invention is applied is provided with the detection section 50 and the control section 30. The detection section 50 detects an operation to the screen SC. The control section 30 discriminates the pointing element 70 with which the operation detected by the detection section 50 has been performed, and then associates the operation and the pointing element 70 with each other. Further, the control section 30 processes the operation associated with the pointing element 70 out of the operations detected by the detection section 50. Further, in a case in which the first operation and the second operation, which is performed within a predetermined period of time (first time) before the first operation, with the long-sleeve pointing element 70A (a first pointing element) are detected, and a coordinate of the first operation and a coordinate of the second operation are located within a predetermined range (a first range), the control section 30 determines the coordinate of the first operation as the same coordinate as the coordinate of the second operation. Further, in the case in which the first operation (corresponding to a third operation according to the invention) and the second operation (corresponding to a fourth operation according to the invention), which is performed within a predetermined period of time (second time) before the first operation, with the short-sleeve pointing element 70B (a second pointing element) are detected, and the coordinate of the first operation (corresponding to the third operation according to the invention) and the coordinate of the second operation (corresponding to the fourth operation according to the invention) are located within a predetermined range (a second range), the control section 30 determines the coordinate of the first operation (corresponding to the third operation according to the invention) as the same coordinate as the coordinate of the second operation (corresponding to the fourth operation according to the invention). Therefore, it is possible to improve the operability of the operation with the pointing element 70. It should be noted that the first time and the second time can also be the same.

It should be noted that the embodiment and the modified examples described above are nothing more than an example of a specific aspect to which the invention is applied, and therefore, do not limit the invention. Therefore, it is also possible to implement the invention as a different aspect. For example, the pointing element 70 is not limited to the pointing element 70 having the pen-like shape, but it is also possible to use a laser pointer, a pointer rod, and so on, and the shape and the size are not particularly limited. Further, the pointing element 70 can also be a hand finger of the user.

Further, although in the embodiment described above, it is assumed that the detection section 50 shoots the screen SC with the shooting section 51 to identify the position of the pointing element 70, the invention is not limited to this configuration. For example, the shooting section 51 is not limited to a device provided to the main body of the projector 10 and shooting the projection direction of the projection optical system 23. It is also possible to configure the position detection device using the shooting section 51 separated from the main body of the projector 10 so that the shooting section 51 may perform shooting from the side or the front of the screen SC. Further, it is also possible to dispose a plurality of shooting sections 51 to detect the position of the pointing element 70 by the detection section 50 based on the data of the shot images by the plurality of shooting sections 51. Further, the functions of the detection section 50, the detection control section 32 and the processing section 33 of the control section 30 can be realized as a position detection device independent of the projector 10. Further, there can also be realized a configuration in which a display device other than the projector is provided with the functions of the detection section 50, and the detection control section 32 and the processing section 33 of the control section 30 to operate the display device as the position detection device.

Further, although in above description of the embodiment, there is described the configuration in which the signal for synchronization is transmitted from the projector 10 to the pointing element 70 using the infrared signal emitted by the transmitting section 53, the signal for synchronization is not limited to the infrared signal. For example, it is possible to adopt a configuration of transmitting the signal for synchronization with radio wave communication or ultrasonic wireless communication. This configuration can be realized by providing the transmitting section 53 for transmitting the signal with the radio wave communication or the ultrasonic wireless communication to the projector 10, and providing the similar receiving section to the pointing element 70.

Further, although in the above description of the embodiment, there is described the example of determining whether or not the tip portion 71 of the pointing element 70 is pressed against the screen SC based on the lighting pattern of the transmitting/receiving section 74, the invention is not limited to this example. For example, whether or not the tip portion 71 of the pointing element 70 is pressed against the screen SC can also be determined by detecting the image of the pointing element 70 and the image of a shadow of the pointing element 70 from the data of the shot image.

Further, although in the above description of the embodiment, the explanation is presented citing the configuration, in which the three transmissive liquid crystal panels corresponding respectively to the colors of R, G, and B are used as the light modulation device 22 for modulating the light emitted by the light source, as an example, the invention is not limited to this example. For example, it is also possible to adopt a configuration of using three reflective liquid crystal panels, or to use a system having a liquid crystal panel and a color wheel combined with each other. Further, the invention can be constituted by a system using three digital mirror devices (DMD), a DMD system having a single digital mirror device and a color wheel combined with each other, or the like. In the case of using just one liquid crystal panel or DMD as the light modulation device, the member corresponding to the combining optical system such as the cross dichroic prism is unnecessary. Further, besides the liquid crystal panel or the DMD, any light modulation devices capable of modulating the light emitted by the light source can be adopted without problems.

Further, each of the functional sections of the projector 10 shown in FIG. 2 is for showing the functional configuration, and the specific mounting forms are not particularly limited. In other words, it is not necessarily required to install the hardware corresponding individually to each of the functional sections, but it is obviously possible to adopt the configuration of realizing the functions of the plurality of functional sections by a single processor executing a program. Further, a part of the function realized by software in the embodiments described above can also be realized by hardware, or a part of the function realized by hardware can also be realized by software. Besides the above, the specific detailed configuration of each of other sections of the projector 10 can arbitrarily be modified within the scope or the spirit of the invention.

What is claimed is:

1. A position detection device comprising:
one or more processors configured to:
detect an operation to a display surface;
discriminate a pointing element with which the operation detected by a detection section is performed, and associate the operation and the pointing element with each other; and
process the operation associated with the pointing element out of the operations detected by the detection section,
wherein, in a case in which a first operation and a second operation, which is performed within a predetermined period of time before the first operation, with a single pointing element are detected, and a coordinate of the first operation and a coordinate of the second operation are located within a predetermined range, the one or more processors determine the coordinate of the first operation as a same coordinate as the coordinate of the second operation, and
the one or more processors change the predetermined range in accordance with a length of the pointing element.

2. The position detection device according to claim 1, wherein
the one or more processors set the range so that the greater the length of the pointing element is, the larger the range is.

3. The position detection device according to claim 1, further comprising:
a storage section having a memory and adapted to store discrimination information used to discriminate the pointing element and information of the range set in accordance with the pointing element so as to be associated with each other,
wherein the one or more processors determine whether or not the coordinate of the first operation is to be treated as a same coordinate as the coordinate of the second operation based on the information of the range corresponding to the pointing element discriminated.

4. A display device comprising:
one or more processors configured to:
display an image on a display surface;
detect an operation to the display surface;
discriminate a pointing element with which the operation detected by a detection section is performed, and associate the operation and the pointing element with each other; and
process the operation associated with the pointing element out of the operations detected by the detection section,
wherein, in a case in which a first operation and a second operation, which is performed within a predetermined period of time before the first operation, with a single pointing element are detected, and a coordinate of the first operation and a coordinate of the second operation are located within a predetermined range, the one or more processors determine the coordinate of the first operation as the same coordinate as the coordinate of the second operation, and
the one or more processors change the predetermined range in accordance with a length of the pointing element.

5. A method of controlling a position detection device, comprising:
detecting an operation to a display surface;
discriminating a pointing element with which the operation detected in the detecting is performed, and associating the operation and the pointing element with each other; and
processing the operation associated with the pointing element out of the operations detected in the detecting,
wherein, in a case in which a first operation and a second operation, which is performed within a predetermined period of time before the first operation, with a single pointing element are detected, and a coordinate of the first operation and a coordinate of the second operation are located within a predetermined range, the coordinate of the first operation is determined as the same coordinate as the coordinate of the second operation in the associating, and the predetermined range is changed in accordance with a length of the pointing element.

\* \* \* \* \*